United States Patent [19]

Iwata et al.

[11] Patent Number: 4,885,572
[45] Date of Patent: Dec. 5, 1989

[54] ANTI-THEFT ALARM DEVICE FOR VEHICLE

[75] Inventors: Keisuke Iwata, Tokyo; Yoshikazu Kojima, Urawa, both of Japan

[73] Assignees: Iwata Electric Co., Ltd.; Kobishi Electric Co., Ltd., both of Japan

[21] Appl. No.: 292,250

[22] Filed: Dec. 30, 1988

[51] Int. Cl.$^4$ .......................... G08B 1/00; B60R 25/10
[52] U.S. Cl. .................... 340/425.5; 340/426; 340/429; 340/430; 340/528; 340/692
[58] Field of Search ............... 340/425.5, 531, 426, 340/429, 430, 438, 460, 506, 539, 528, 692, 691, 825.69, 825.72; 307/10.2

[56] References Cited

U.S. PATENT DOCUMENTS 4,383,242 5/1983 Sassover et al. ............... 340/64
4,794,368 12/1988 Grossheim et al. ............. 340/692

OTHER PUBLICATIONS 53-25637, Japanese Patent Application; 11-5-74 pp. 1-3.
54-101993, Japanese Utility Model, 6-27-79 pp. 1-16.
54-101994, Japanese Utility Model, 6-27-79 pp. 1-12.

Primary Examiner—Donnie L. Crosland
Attorney, Agent, or Firm—Joseph S. Iandiorio; Brian M. Dingman

[57] ABSTRACT

An anti-theft alarm device for a vehicle, the device having: (a) a detector for detecting an emergency of the vehicle and for emitting a detection signal; (b) a switch for setting and deactivation the alarm device, the switch emitting selectively a setting and a deactivation signal; (c) a control circuit for transmitting selectively an alarm signal in response to the detection signal and confirmation signals in response to setting signal and deactivation signal, the confirmation signals being weaker than a alarm signal; (d) an alarm speaker for selectively generating an alarm sound and a confirmation sound in response to the alarm signal and the confirmation signals respectively, whereby generating an alarm sound according to an emergency of the vehicle and a confirmation sound when the alarm device is set and deactivated.

7 Claims, 2 Drawing Sheets

ANTI-THEFT ALARM DEVICE FOR VEHICLE

BACKGROUND OF THE INVENTION

This invention relates to an anti-theft alarm device for a vehicle, and more specifically relates to a device whose sound for confirmation at setting and sound at deactivation is softer than the sound of the alarm itself.

A conventional anti-theft alarm device for a vehicle has a motion detector which detects shaking of the vehicle. The motion detector is connected to a speaker in the vehicle via a control circiut which sounds the speaker. The control circuit has a receiver to receive an electric wave generated by a portable transmitter. The transmitter has a setting button and deactivation button for setting or deactivating the alarm. Thus, the device acts under wireless control. If the vehicle is shaken by a person, e.g., a thief, before deactivation, the motion detector detects movement and transmits the signal to the speaker. The speaker then emits a loud sound, drawing the attention of anyone nearby, and frightening the thief away.

In order to set the device when a driver leaves a vehicle, the driver pushes the setting button of the transmitter to "on". To deactivate the device on the driver's return, before opening the door to get in the vehicle, the driver pushes the deactivation button "on". Then, the door can be opened without the alarm sounding. When the driver pushes one of the buttons on the transmitter for the device to set or deactivate it, the speaker sounds for a moment to inform the driver that setting or deactivation is definitely completed.

A problem with the device described above is that when the device is set or deactivated, the sound of speaker is as loud as the alarm sound, it often startles people nearby, and the fact that the vehicle is protected by an anti-theft alarm is revealed.

SUMMARY OF THE INVENTION

In order to solve the above inconvenience, it is an object of the present invention to provide an anti-theft alarm device for a vehicle whose sound at setting or deactivation is not loud as the alarm itself. As same as conventional anti-theft alarms, if the vehicle is shaken by a person, e.g., a thief, before deactivation, the motion detector detects movement and transmits the signal to the speaker. The speaker then emits a loud sound, drawing the attention of people nearby, and frightens the thief away. Furthermore, when the driver uses a device of the present invention, and he sets or deactivates the device, the speaker sounds softly for a moment. The driver can hear the confirmation sound and recognize that setting or deactivation is definitely completed. The softer sound does not startle people nearby and the setting or deactivation is not revealed to other people.

BRIEF DESCRIPTION OF THE DRAWINGS

With reference to the accompany drawings.

DETAILED DESCRIPTION OF THE PREFERRED EMBODIMENTS

Preferred embodiments of the invention will not be described in reference to the attached drawings.

Figure 1:
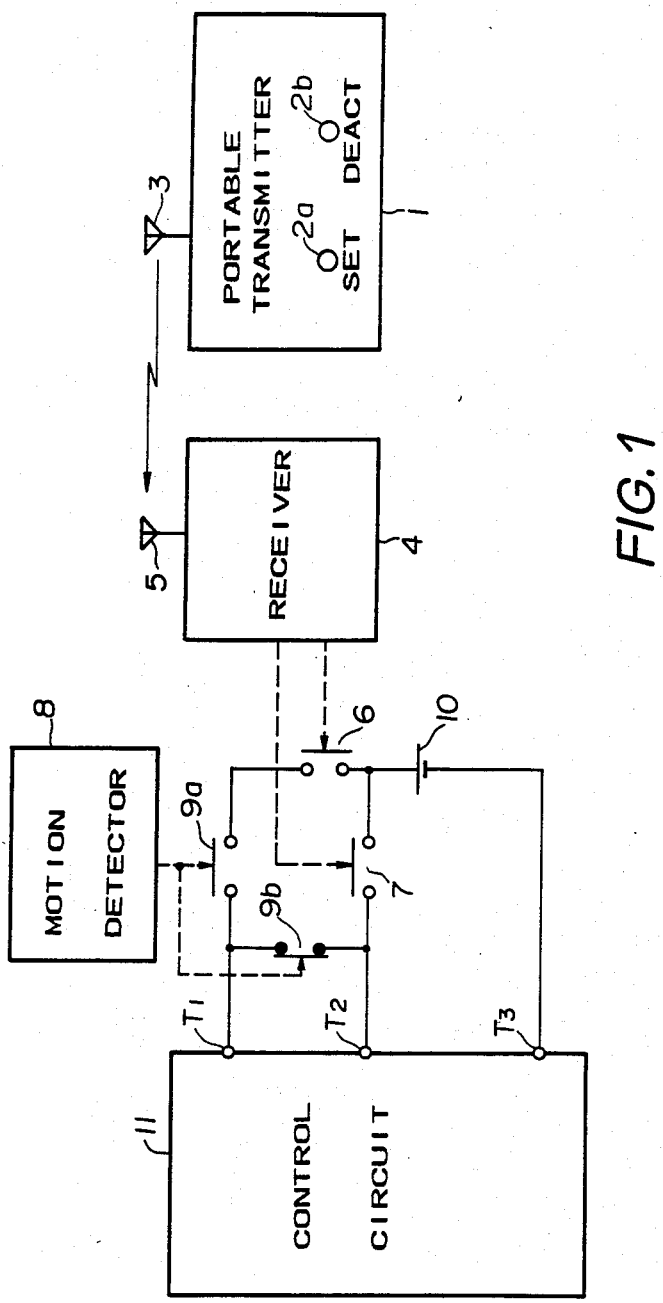
FIG. 1 is a block diagram of an anti-theft alarm device for a vehicle according to the present invention.

As shown in FIG. 1, reference numeral 1 designates a portable transmitter. When the driver leaves his vehicle, he brings the transmitter 1 with him. All other elements are installed in the vehicle. The transmitter 1 has a setting button 2a, a deactivation button 2b, and an antenna 3. When the setting button 2a is pushed, transmitter 1 generates a setting signal, e.g., a pulse signal whose wavelength is T, this wave, modulated by the setting signal, is transmitted from the antenna 3. When the deactivation button 2b is pushed, transmitter 1 generates a deactivation signal, e.g., a pulse signal whose wavelength is 2T, this wave, modulated by the deactivation signal, is transmitted from the antenna 3. The receiver 4 receives both of these electric waves via its antenna 5, and then demodulates the wave to either the setting signal or the deactivation signal and respectively emits these signals. By the demodulation of the setting signal, a switch 6 is turned on, and a switch 7 is turned on for a moment. By the demodulation of the deactivation signal, the switch 6 is turned off and, the switch 7 is turned on twice for a moment. The portable transmitter 1 and the receiver 4 are elements of a switch means as mentioned above. Reference numeral 8 designates a motion detector (detecting means) which detects the vehicle's movement surpassing a predetermined level. When the vehicle is shaken, the motion detector detects and generates a detection signal to turn on a switch 9a for five minutes and to turn off a switch 9b for five minutes. A battery 10 for the vehicle is connected in such a manner that the positive terminal is connected to a terminal T1 of the control circuit (control means) 11 via the switch 6, 9a, or 9b and the negative terminal is connected to a terminal T3 of the control circuit 11.

Figure 2:
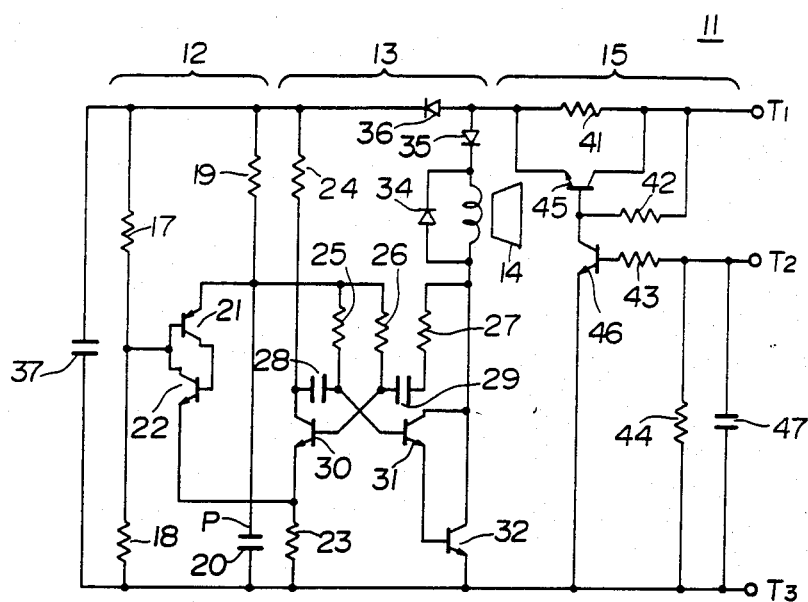
FIG. 2 is a circuit diagram of an control circuit in an anti-theft alarm device for a vehicle according to the present invention.

The control circuit 11, shown in detail in FIG. 2, is a circuit for generating the alarm sound in an emergency. The control circuit has a first oscillator 12 to oscillate at about 4 Hz, a second oscillator 13 to oscillate at about 2000 Hz, an alarm speaker (sound emitting means) 14 sounded by the second oscillator 13, and a volume-control circuit 15 for controlling the volume of the alarm sound of the speaker 14. The first oscillator 12 has three resistor 17-19, a capacitor 20, a PNP transistor 21, and an NPN transistor 22. In the first oscillator 12, when the voltage of a terminal P of the capacitor 20 increases slightly above the voltage of a junction between the resistors 17 and 18, both of the transistors 21 and 22 are turned on to discharge the capacitor 20 to the transistors 21 and 22 via the resistor 23. Then, the capacitor 20 is recharged and when the voltage of a terminal P of the capacitor 20 slightly rises over the voltage of a junction between the resistors 17 and 18, the discharging occurs again. Subsequently, this action is repeated.

The second oscillator 13 is a well-known unstable multi-vibrator having capacitors 28 and 29 and an NPN transistor 30 and 31. In the second oscillator 13, transistors 30 and 31 are alternately turned on and off at 2000 Hz defined by the resistor value of the resistor 25 and 26, and capacity value of the capacitor 28 and 29. A junction between the resistor 25 and 26 is connected to the emitter of the transistor 21 of the first oscillator 12. Thus, oscillating output from the second oscillator 13 is modulated with the oscillating output from the first oscillator 12 at 4 Hz. When the discharged current from the capacitor 20 of the first oscillator flows in the resistor 23, oscillation of the second oscillator 13 is interrupted for a moment.

Oscillation output of the second oscillator 13 is multiplied in a transistor 32 which is connected to the transistor 31 to make a Darlington pair therewith. The multiplied output causes the alarm speaker 14 to vibrate. The speaker 14 produces a sound of 2000 Hz tone pitch modulated by the signal of 4 Hz. The sound is intermittent due to the interrupting of oscillation of the oscillator 13.

In FIG. 2, reference numeral 34 designates a diode for absorbing a backward voltage generated from a coil of the speaker 14. Both numerals 35 and 36 designate diodes for isolating the power source of the speaker 14 from the power source of the first oscillator 12. Numeral 37 designates a capacitor for stabilizing voltage of the power source of the first oscillator 12.

The volume-control circuit 15 has resistors 41–44, transistors 45 and 46, and a capacitor 47. When a terminal T2 accepts a positive voltage from the power source, the transistor is turned on. Thus, the potential of the transistor 45 becomes zero-level and the transistor 45 is turned off. As a result, when a terminal T1 accepts a positive voltage from the power source, the same voltage is received by anodes of the diodes 35 and 36 via the resistor 41. On one hand, when the terminal T2 does not receives the positive voltage, the transistor 46 is in an off-state. In this case, when the terminal T1 accepts the positive voltage, the transistor 45 turns on and the same voltage from the power source is received by the anodes of the diodes 35 and 36 without dropping due to the resistor 41.

The following describes the operation of the above-mentioned anti-theft alarm device. First, the driver leaves the vehicle with the portable transmitter 1. When the driver pushes the setting button 2a, the electric wave of the setting signal is transmitted from the antenna 3 to the receiver 4. The receiver 4 accepts the electric wave, the switch 6 is turned on, and the switch 7 is turned off for a moment. When the switch 7 is turned on, the positive voltage of the battery 10 is received by the terminals T1 and T2 of the control circuit 11. The transistor 45 of the control circuit 11 is turned off, then the positive voltage is received by the diodes 35 and 36 via the resistor 41. The voltage is dropped weaker in current because the resistor 41 and becomes a confirmation signal. Thus, the first and the second oscillators 12 and 13 oscillate in order for the alarm speaker to produce confirmation sound to indicate that setting has effectuated. The confirmation sound produced from the speaker 14 then is relatively soft compared to anti-theft alarms. The driver recognizes the device is operational and is set to produce the alarm sound during an attempt theft. When the switch 7 is turned off, the terminals T1 and T2 are isolated from the voltage and this stops the sound. Thereafter, the device will activated and will be able to produce an alarm sound during an emergency. If the driver wants to recheck that the device is activated, he may push the setting button 2a again, and the setting sound will be emitted again.

If the vehicle is shaken, the motion detector 8 detects the movement and generates a detection signal. The detection signal turns the switch 9a on and turns the switch 9b off. Thus, the transistor 45 is turned on, and the positive voltage of the battery 10 is received by the anodes of the diodes 35 and 36 without dropping by the resistor 41. The voltage without dropping by the resistor 41, that is, an alarm signal reaches the alarm speaker 14. Then, the loud alarm sound is produced by the alarm speaker 14. This loud sound will be continually emitted for five minutes. At the end of the five minutes, the switch 9a is turned off, and the switch 9b is turned on. The alarm sound then stops.

When the driver pushes the deactivation button 2b of the transmitter 1 to deactivate the alarm, the electric wave of the deactivation signal is transmitted from the antenna 3 to the receiver 4. The receiver 4 accepts the electric wave, the switch 6 is turned off, and the switch 7 is turned on twice for a moment. When the switch 7 is turned on twice for a moment, the positive voltage of the battery 10 is received by the terminals T1 and T2 of the control circuit 11. The transistor 45 of the control circuit 11 is turned off, then the positive voltage is received by the diodes 35 and 36 via the resistor 41. The voltage is drropped weaker in current because the resistor 41 and becomes a confirmation signal. Thus, the first and the second oscillators 12 and 13 oscillate in order for the alarm speaker to produce confirmation sound to indicate that deactivating has effectuated. The alarm speaker 14 produces relatively soft sound twice. The driver recognizes that the deactivation of the alarm is completed. The reason of that the confirmation sounds are soft is that the confirmation signals are dropped by the resistor 41 connected in series with the control circuit 11 including the resistor 41.

Figure 3:
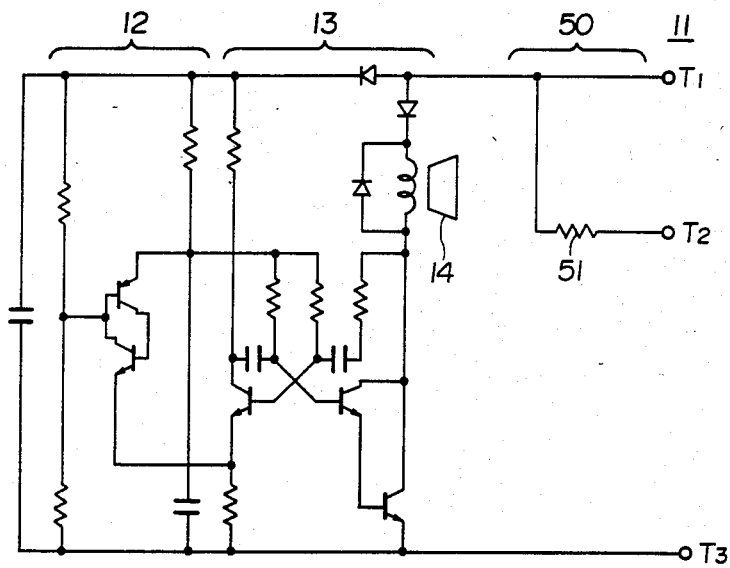
FIG. 3 is a circuit diagram of another control circuit in an anti-theft alarm device for a vehicle according to the present invention.

FIG. 3 shows another control circuit 11. The circuit 11 in FIG. 3 comprises only a volume-control circuit 50 and a resistor 51. If the circuit is in use, it is necessary to always turn off the switch 9b shown in FIG. 1.

Although a specific embodiment of an anti-theft alarm device for a vehicle in accordance with the present invention has been described, modifications may be made in a manner obvious to those skilled in the art. For example, a detecting means can replace the motion detector 8 for detecting a motion surpassing a predetermined level. The detecting means which is connected or attached to doors, a trunk lid, and a hood of the vehicle detects opening of the doors, the trunk lid, and the hood. When one of the doors, the trunk lid, and the hood is opened, the detecting means detects the opening and emits a detection signal.

What is claimed is:

1. An anti-theft alarm device for a vehicle, the device comprising:
  (a) means for detecting an emergency of the vehicle and for emitting, in response to said emergency, a detection signal;
  (b) switch means for setting and deactivating the alarm device, said switch means operable to selectively transmit a set signal in response to the activation of the alarm device, and a deactivation signal in response to the activation of the alarm device;
  (c) control means, responsive to said means for detecting, for generating an alarm signal having a first electrical current level, and responsive to said switch means, for generating a confirmation signal having a second electrical current level which is lower than said first electrical current level; and
  (d) sound emitting means, responsive to said alarm signal, for generating an alarm sound having a first audible sound level and, responsive to said confirmation signal, for generating a confirmation sound having a second audible sound level which is lower in sound level than said first audible sound level of said alarm sound.

2. An anti-theft alarm device for a vehicle according to claim 1, wherein said control means emits said alarm signal only when said detection signal is received after said set signal and before said deactivation signal.

3. An anti-theft alarm device for a vehicle according to claim 1, wherein said detecting means includes a motion detector for detecting a motion surpassing a predetermined level.

4. An anti-theft alarm device for a vehicle according to claim 1, wherein said switch means includes a portable transmitter for transmitting setting and deactivating electric waves and a receiver for receiving the setting and the deactivating electric waves and emitting, respectively, the set and the deactivation signals.

5. An anti-theft alarm device for a vehicle according to claim 1, in which said confirmation signal includes a first confirmation signal in response to the reception of said set signal from said switch means, and a second confirmation signal in response to the reception of said deactivation signal from said switch means.

6. An anti-theft alarm device for a vehicle according to claim 5, wherein said first and second confirmation signals are energized for a shorter duration of time than said alarm signal.

7. An anti-theft alarm device for a vehicle according to claim 1, wherein the electrical current of said confirmation signals are reduced by means of a resistance selectably connected in series with said control means and said sound emitting means.

* * * * *